United States Patent
Mutzabaugh et al.

(10) Patent No.: US 8,422,611 B2
(45) Date of Patent: Apr. 16, 2013

(54) ANALOG EQUALIZER SYSTEMS AND METHODS FOR BASEBAND VIDEO SIGNALS

(75) Inventors: Dennis Mutzabaugh, Mount Prospect, IL (US); Paul Snopko, Chicago, IL (US); Greg Tomezak, Buffalo Grove, IL (US)

(73) Assignee: Techwell, Inc., San Jose, CA (US)

( * ) Notice: Subject to any disclaimer, the term of this patent is extended or adjusted under 35 U.S.C. 154(b) by 539 days.

(21) Appl. No.: 12/698,061

(22) Filed: Feb. 1, 2010

(65) Prior Publication Data

US 2010/0321580 A1 Dec. 23, 2010

Related U.S. Application Data

(60) Provisional application No. 61/187,986, filed on Jun. 17, 2009, provisional application No. 61/187,970, filed on Jun. 17, 2009, provisional application No. 61/187,977, filed on Jun. 17, 2009, provisional application No. 61/187,980, filed on Jun. 17, 2009, provisional application No. 61/187,996, filed on Jun. 17, 2009.

(51) Int. Cl.
*H04B 1/10* (2006.01)

(52) U.S. Cl.
USPC ............................ 375/350; 375/316; 375/346

(58) Field of Classification Search ................ 375/350
See application file for complete search history.

(56) References Cited

U.S. PATENT DOCUMENTS

| 5,559,808 | A | 9/1996 | Kostreski et al. | |
|---|---|---|---|---|
| 6,545,622 | B1* | 4/2003 | Kamal et al. | 341/144 |
| 6,882,634 | B2 | 4/2005 | Bagchi et al. | |
| 7,003,030 | B2 | 2/2006 | Abdelilah et al. | |
| 7,089,577 | B1 | 8/2006 | Rakib et al. | |
| 7,248,841 | B2 | 7/2007 | Agee et al. | |
| 7,778,323 | B1* | 8/2010 | Nodenot et al. | 375/233 |
| 8,081,675 | B2* | 12/2011 | Shakiba et al. | 375/229 |
| 2009/0086806 | A1* | 4/2009 | Hwang et al. | 375/232 |
| 2009/0097590 | A1* | 4/2009 | McCallister et al. | 375/296 |
| 2012/0063531 | A1* | 3/2012 | Ginis et al. | 375/285 |

OTHER PUBLICATIONS

PCT International Search Report for PCT/US2010/022772 dated Jun. 7, 2010.

* cited by examiner

*Primary Examiner* — Erin File

(74) *Attorney, Agent, or Firm* — Anthony Smyth; Loza & Loza, LLP

(57) ABSTRACT

An equalizer and methods for equalizing a cable-borne signal are described. The cable-borne signal includes a digital signal and a baseband analog signal separated by frequency. Distortions are removed from the digital signal and an analog equalizer compensates for attenuations of the analog signal caused by the cable based on equalization settings of a digital equalizer. A baseband analog filter can be selected based on an estimate calculated by the digital equalizer of difference in attenuation at different frequencies.

19 Claims, 14 Drawing Sheets

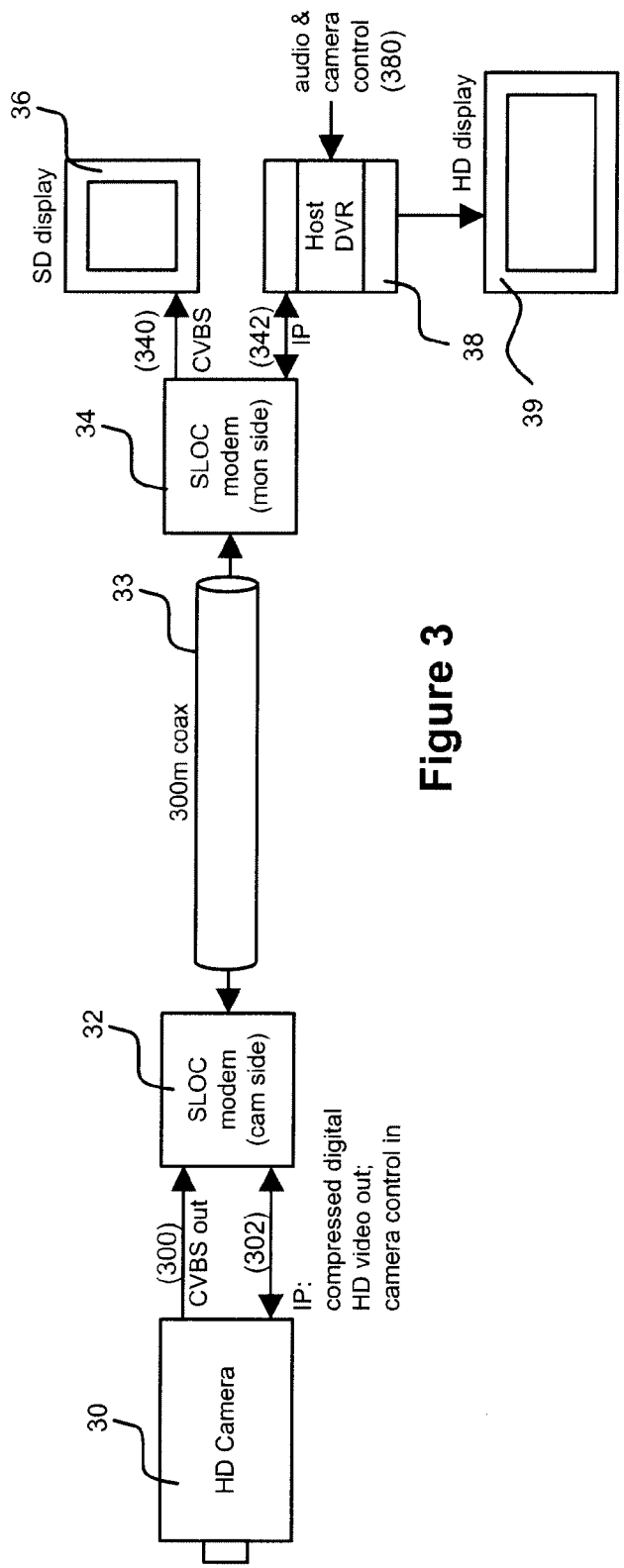
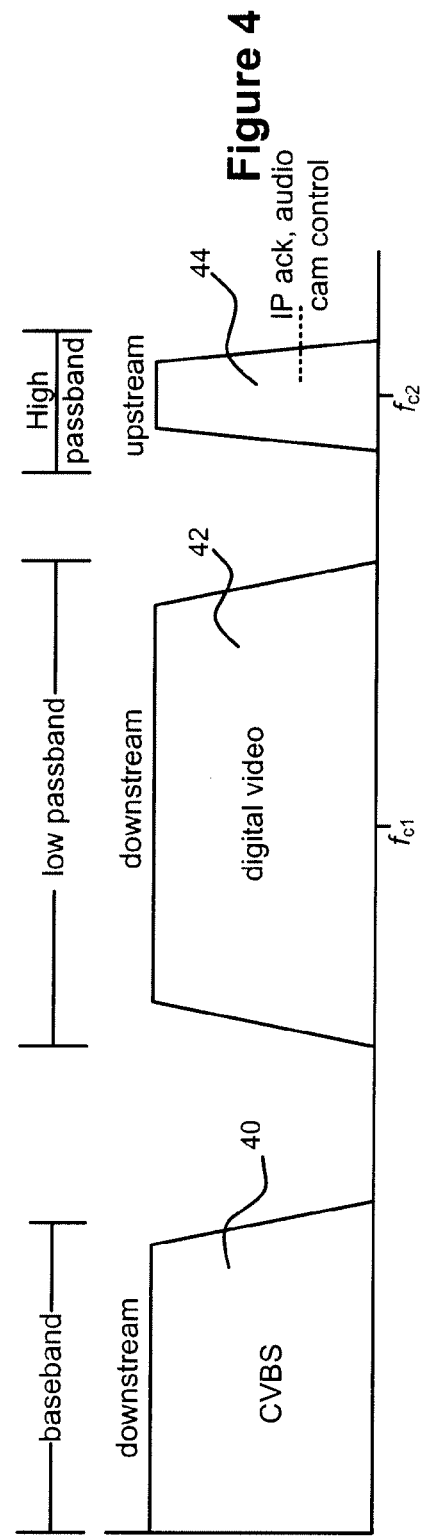

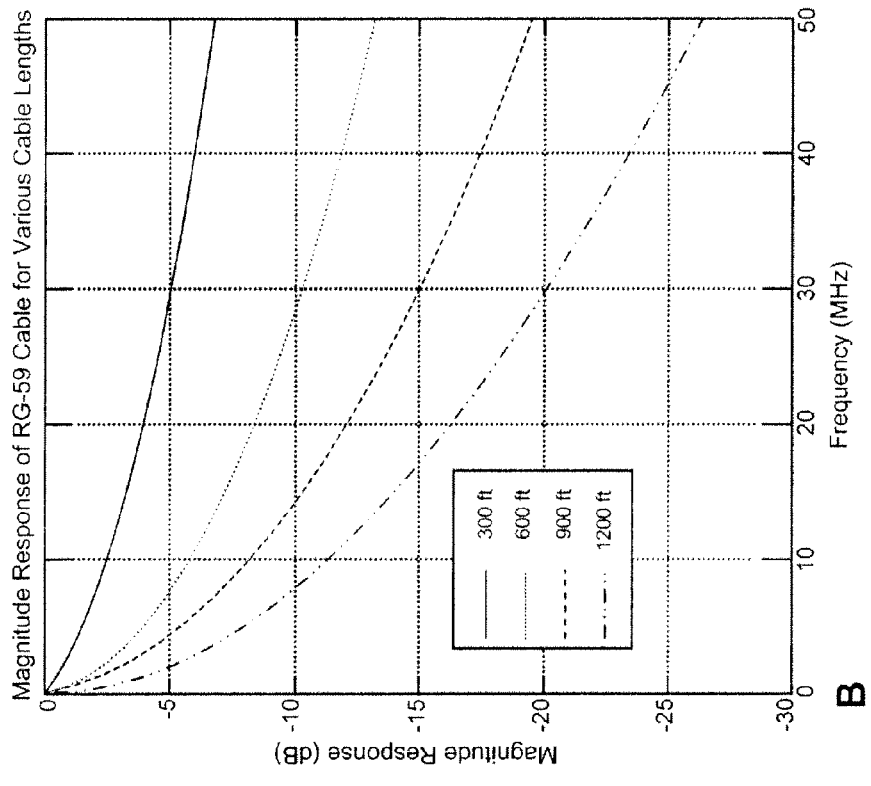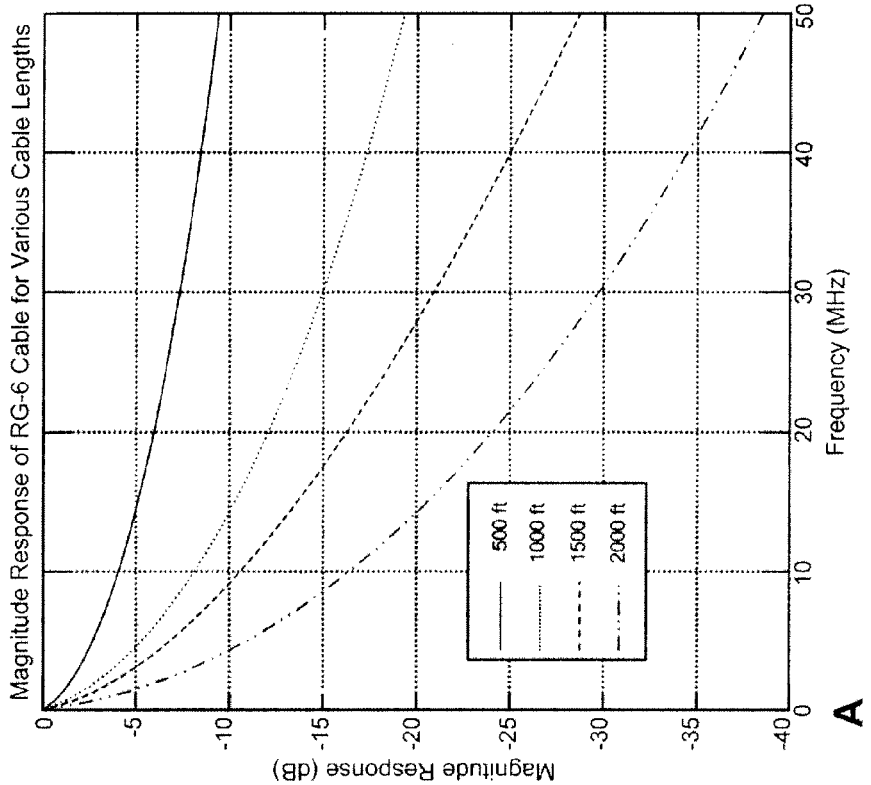
Figure 10

ANALOG EQUALIZER SYSTEMS AND METHODS FOR BASEBAND VIDEO SIGNALS

CROSS-REFERENCE TO RELATED APPLICATIONS

The present application claims priority from U.S. Provisional Patent Application No. 61/187,970 filed Jun. 17, 2009, entitled "SLOC Analog Equalizer For Baseband Video Signal," and from U.S. Provisional Patent Application No. 61/187,977 filed Jun. 17, 2009, entitled "A Method For Constellation Detection In A Multi-Mode QAM Communications System," and from U.S. Provisional Patent Application No. 61/187,980 filed Jun. 17, 2009, entitled "Novel Carrier Phase Offset Correction For A QAM System," and from U.S. Provisional Patent Application No. 61/187,986 filed Jun. 17, 2009, entitled "Novel Frame Structure For A QAM System," and from U.S. Provisional Patent Application No. 61/187,996 filed Jun. 17, 2009, entitled "SLOC SPOT Monitoring," which applications are hereby expressly incorporated by reference herein.

The present application is related to U.S. patent application Ser. No. 12/363,669, filed Jan. 30, 2009, entitled "Mixed Format Media Transmission Systems and Methods," which is incorporated herein by reference.

BACKGROUND OF THE INVENTION

1. Field of the Invention

The present invention relates generally to multimedia transmission systems and more particularly to systems and methods for transmitting high definition digital video and standard definition analog video over a single cable.

2. Description of Related Art

With the advent of digital broadcast television and streaming video technologies various video cameras, monitors and video recorders have become available with enhanced resolution and advanced features. Closed circuit television (CCTV) systems now offer high definition video outputs and compressed digital video signals for use in applications such as premises surveillance, access control and remote monitoring of facilities. However, legacy systems remain in place and standard definition analog video signals are in widespread use and will continue to be used during the transition to all-digital, high-definition systems. In particular, coaxial cable (coax) has been extensively deployed to carry signals from analog CCTV cameras to monitoring stations. Also, some deployed CCTV cameras transmit compressed digital video signals over local area networks, and these cameras may use the Internet Protocol (IP) as a communications means for transmitting the compressed video signal over category 5 (CAT5) twisted pair cable.

FIG. 1 illustrates a system using coax to carry standard definition analog video. A basic analog camera typically generates a composite video baseband signal (CVBS) that can be transmitted up to 300 meters or more using Coax. The CVBS signal is commonly provided to a video recording system which often comprises a digital video recorder (DVR) that digitizes the CVBS signal and records it. A conventional monitor or display device may be connected directly to the coax to display live standard definition video and to the DVR for playback of recorded video. The standard definition (SD) video typically has a resolution of 720×480 pixels.

FIG. 2 illustrates approaches to transmitting high definition (HD) video (1920×1080 pixels) in currently deployed systems. An IP based, HD camera may generate a compressed digital HD video signal over 100 Mbps Ethernet using standard CAT5 twisted pair cable for distances up to 100 meters. The signal is received by a host processor and DVR. The HD video can be viewed live and also recorded for non-real time playback. The use of IP networking to enable the camera to transmit digital video allows these systems to add some upstream communications from the monitor (display) side back to the camera side, typically camera control and audio signals. It should be noted that for the live video, noticeable delay may occur due to latency in the IP network and due to the time needed for the host processor to reconstruct the compressed digital video. However, the use of IP networking enables the use of networking tools, including routers, to combining traffic to or from multiple cameras and/or DVR recording and monitoring devices in different network connected locations.

BRIEF SUMMARY OF THE INVENTION

Certain embodiments of the present invention comprise systems and methods for ameliorating the effects of high frequency roll off in cables that causes more high frequency attenuation as the cable length increases. This tilt introduced by the cable degrades the baseband analog video and passband digital video signals, where the degradation worsens as the length of the cable increases. However, certain embodiments of the invention provide an equalizer, typically in the digital receiver, that removes the tilt on digital passband signals, enabling reliable decoding of the transmitted symbols.

Certain embodiments of the invention provide systems and methods removing tilt in a composite video baseband signal ("CVBS") in order to reduce attenuation of higher frequencies in the CVBS, thereby avoiding loss of sharpness of the picture and decreased vividness of the color. A filter can be selected from a known set of analog filters included in the front-end to undo tilt in the CVBS signal. The selection of the filter may be based on estimation of the tilt in the digital passband signal. Estimated tilt can be computed using the converged equalizer taps and an analog filter can be selected to remove tilt in the CVBS signal based on the severity of estimated tilt in the converged equalizer taps.

Certain embodiments of the invention provide an equalizer for use in a cable that carries a digital signal and a baseband analog signal separated by frequency between a transmitter and a receiver. Some of these embodiments comprise a digital equalizer that removes distortions from the digital signal received at the receiver and an analog equalizer that compensates for attenuations of the analog signal caused by the cable. In some of these embodiments, the analog equalizer applies one of a set of baseband analog filters to compensate for the attenuations. The applied baseband analog filter can be selected based on an estimate calculated by the digital equalizer of difference in attenuation at different frequencies. The transmitter may be embodied in a camera and the receiver typically provides an equalized signal representative of the analog signal to a monitor. The cable may comprise a coax cable in which distortions increase with the length of the cable. The distortions may include multipath distortions and an estimate of attenuation (tilt) can be calculated from a frequency band having a power spectral density in which tilt is approximately linear. The tilt can be calculated using a fast Fourier transform for a plurality of filter taps and frequency bins within the frequency band are selected to permit calculation of the frequency response of a filter of the digital equalizer. A discrete Fourier transform of time-domain converged equalizer filter taps may correspond to a specific frequency bin of the DFT.

Certain embodiments of the invention provide system and methods used for equalizing an analog signal in a cable that also carries a digital signal separated from the analog signal by frequency. The method can be performed by a modem that receives the analog and digital signals and outputs a baseband video signal. Tilt is calculated in the digital signal, wherein the tilt characterizes attenuation as a function of frequency attributable to the cable and the digital signal can be equalized based on the calculated tilt. An analog equalizer may be configured by using the calculated tilt to select one of a set of baseband analog filters. The method may additionally include equalizing the analog signal using the selected baseband analog filter. The analog signal typically comprises a baseband video signal and the digital signal may comprise a high definition version of the baseband video signal. The cable comprises a coax cable and the tilt varies with length of the cable derives from multi-path distortions. Calculating tilt can include estimating attenuations within a frequency band having a power spectral density in which tilt is approximately linear and/or using a fast Fourier transform for a plurality of filter taps. Estimating attenuation can include selecting frequency bins within the frequency band, where the selected frequency bins optimize the efficiency of the step of calculating the tilt. In some of these embodiments, the digital signal comprises a high-definition representation of video images captured by a camera, and wherein the analog signal comprises a standard-definition representation of the video images.

BRIEF DESCRIPTION OF THE DRAWINGS

FIG. 3 shows a system for simultaneous transmission of standard definition and high definition video according to certain aspects of the invention.

FIG. 4 shows an encoding system used for simultaneous transmission of standard definition and high definition video according to certain aspects of the invention.

FIG. 10 shows attenuation is depicted as a function of frequency in coax cables.

DETAILED DESCRIPTION OF THE INVENTION

Figure 1:
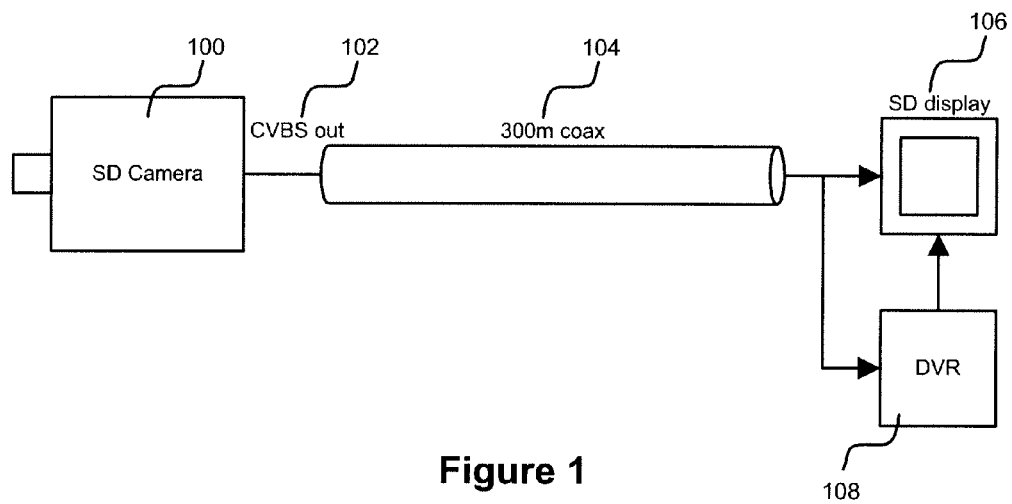
FIG. 1 shows a prior art coax transmission system for standard definition video.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the present invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention improve the performance of systems and apparatus described in the related U.S. patent application Ser. No. 12/363,669 in which baseband video signals may be combined with digital representations of the baseband video signal and with control signals, thereby enabling transmission over a single cable such as a coaxial cable ("coax"). FIG. 3 shows one embodiment that provides a security link over coax ("SLOC") system and FIG. 4 shows one possible modulation scheme for the SLOC system. HD camera 30 provides an IP output 302 comprising compressed digital HD video, and an auxiliary camera output 300 comprising analog SD CVBS. The compressed HD video IP signal 302 is modulated to passband 42 utilizing a SLOC camera side modem 32 that comprises a QAM modulator that provides a modulated signal which may be combined with the baseband analog CVBS signal 300. The combined signal is transmitted "downstream" over coax cable 33, typically for distances that can extend to 300 m or longer. At the monitor side, a SLOC monitor side modem 34 separates the baseband CVBS signal 340 from the passband downstream IP signal 342. The CVBS signal 340 feeds an SD display 36 for delay free live viewing. The passband downstream IP signal 342 is demodulated with a QAM demodulator whose output feeds a host processor and DVR 38 which supports live (though perhaps slightly delayed) HD viewing on monitor 39 and non-real time HD playback for later viewing.

In the example, upstream communication as required by the IP protocol, is provided. Upstream communication may additionally be used to send audio and camera control signals 380 from the monitor side to the camera 30. Typically the bit rate, and thus the required bandwidth, for the upstream signal will be much lower than that required for the downstream passband signal. Monitor side SLOG modem 34 includes a QAM modulator that modulates the IP signal to upstream passband 44. As depicted in FIG. 4, upstream passband 44 and downstream passband 42 are located at different spectral locations. At the camera side, SLOG modem 32 includes a QAM demodulator for receiving the upstream signal. This approach offers several advantages over prior systems and methods, including:

(1) Increased operational range—increased distance.
(2) Systems can be deployed using existing infrastructure including reuse of coax cable.
(3) Availability of low-delay, real-time (live) video.
(4) Live CVBS video and HD video can be viewed in separate locations.

Figure 5:
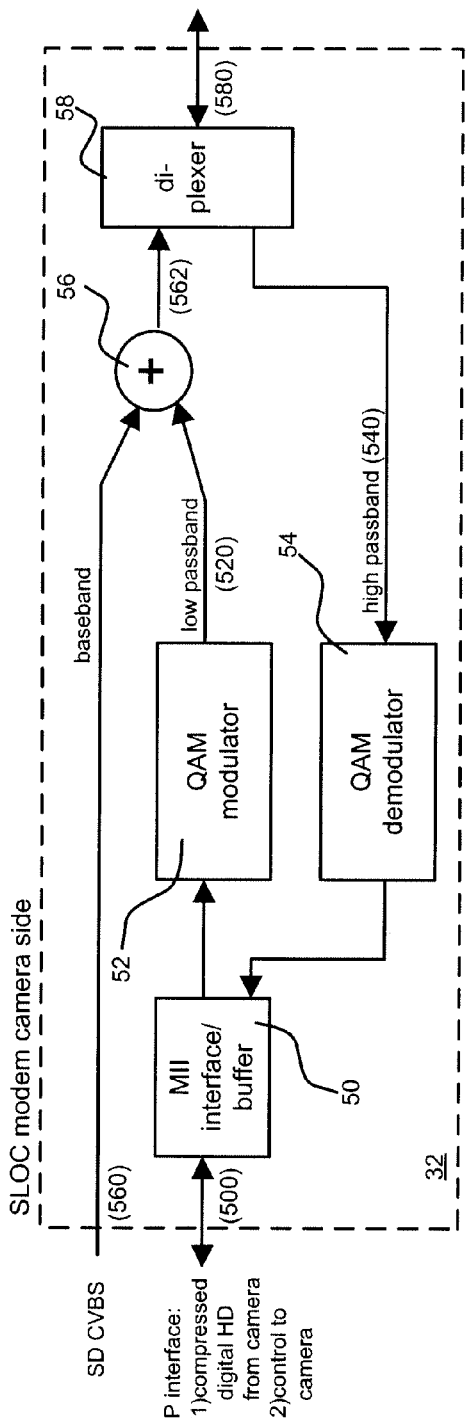
FIG. 5 is a block schematic of a camera side modem according to certain aspects of the invention.

FIG. 5 is a simplified schematic showing additional detail of the SLOC camera-side modem 32 of FIG. 3. The IP connection to the HD camera 500 is interfaced to QAM modulator 52 and QAM demodulator 54 through media independent interface ("MII") module. MII can conform to the IEEE 802.3 standard, for example. QAM modulator 52 operates using well known principles to convert the baseband IP data stream 500 into passband 43 QAM symbols 520. These symbols are summed at 56 with baseband CVBS signal 560 and then fed to the diplexer 58. Diplexer 58 can be a 2-way analog device that passes the combined baseband and low passband downstream signal 562 to the coax and receives the high passband upstream signal 540 from the coax and feeds it to QAM demodulator 54. Demodulator 54 typically operates using well known principles to demodulate the high passband upstream signal 540 received from the monitor side and output baseband data to MII interface 50.

Figure 6:
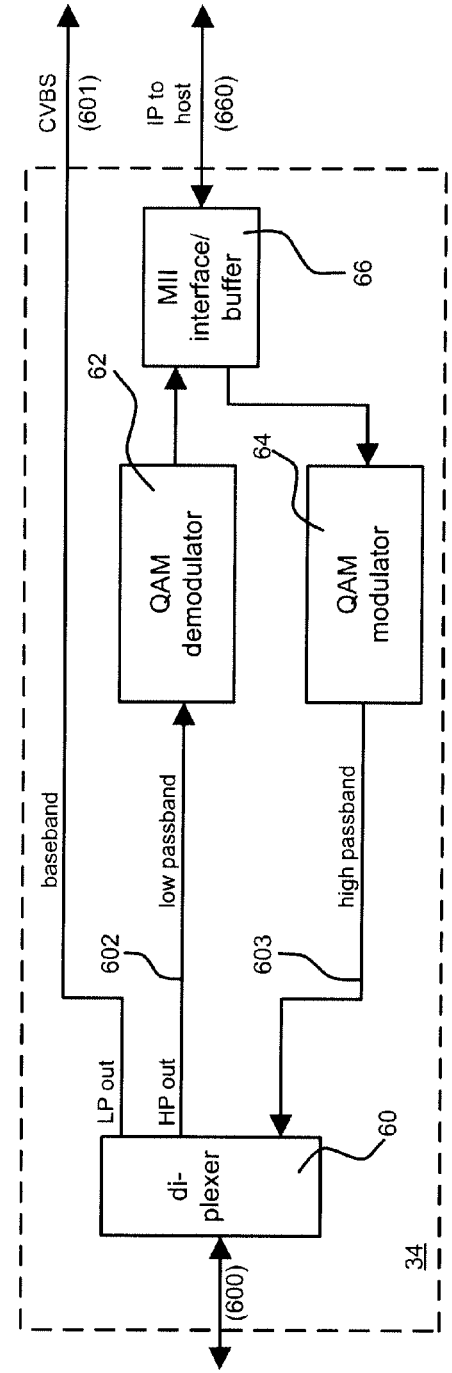
FIG. 6 is a block schematic of a monitor side modem according to certain aspects of the invention.

FIG. 6 is a simplified schematic showing additional detail of the SLOC monitor side modem 34 of FIG. 3. Diplexer 60 receives the downstream combined baseband CVBS and low passband IP signal 600 from a coax cable and splits the signal into component elements 601-603 by low-pass (LP) and high-pass (HP) filtering. CVBS signal 601 may be directly transmitted to a standard definition monitor or other display device. Low passband signal 602 can be fed to QAM demodulator 62 that feeds MII interface module 66. Diplexer can also accept a high passband signal 603 from QAM modulator 64 and may pass this upstream signal to the coax cable. QAM modulator 62 typically takes its input from the MII interface 66 which can be connected to a host/DVR that supports the IP protocol.

Coax cables typically exhibit a significant high frequency roll off characteristic that causes more high frequency attenuation as the cable length increases. This "tilt" can be significant within the band of a passband signal and it can cause considerable inter-symbol interference ("ISI"). Digital equalization may be required to enable QAM demodulator 62 to correctly recover the transmitted data.

Baseband to Passband Modulation

Figure 7:
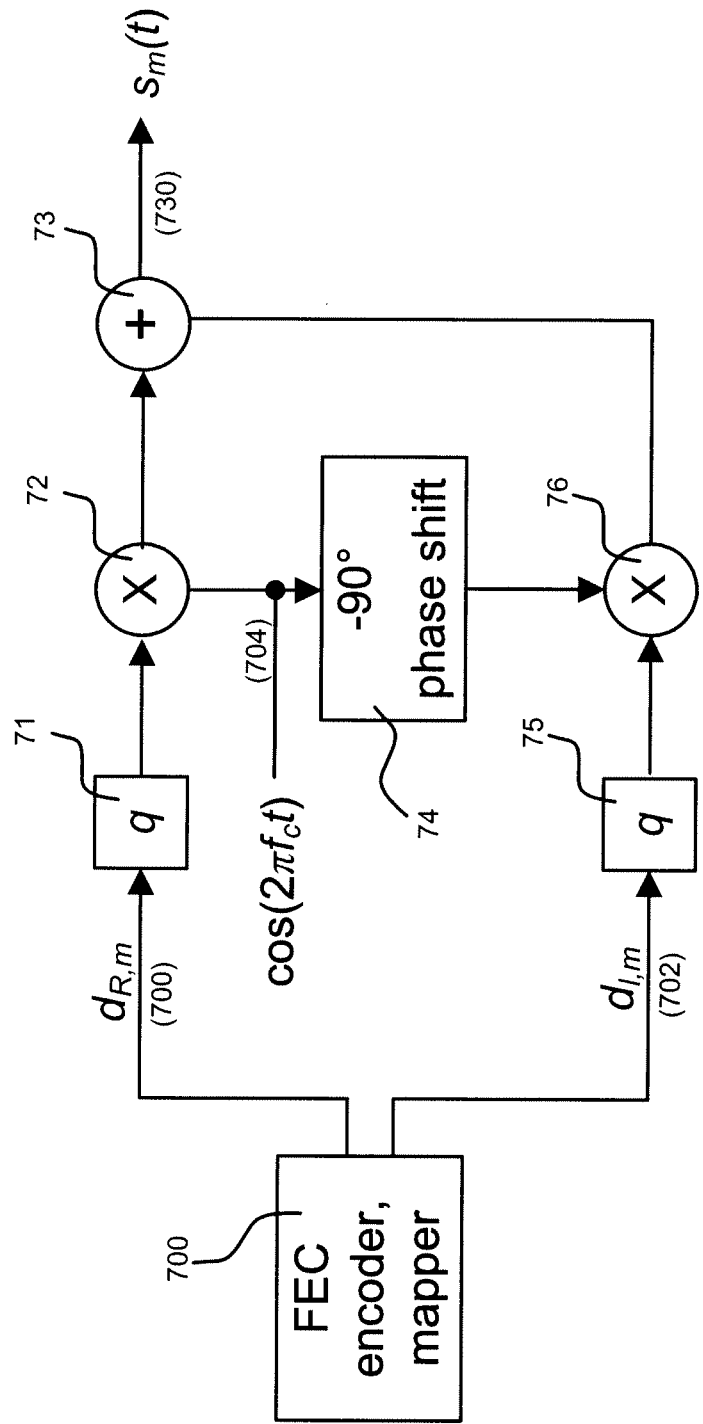
FIG. 7 illustrates a camera side baseband to passband QAM modulator according to certain aspects of the invention.

FIG. 7 shows camera side baseband to passband QAM modulator 52 (FIG. 5) in more detail. Data from MII 50 is received by FEC encoder/mapper 700 which adds error protection data to the data stream received from MII 50 using, for example, concatenated Reed-Solomon coding, byte interleaving and/or trellis coding. Mapper/encoder 700 then demultiplexes the data into two streams 700 and 702, with a given size group of bits for each stream representing a QAM symbol amplitude level respectively in the real and imaginary directions. An isolated transmitted QAM pulse is given by:

$$s_m(t) = d_{R,m}q(t)\cos(2\pi f_c t) - d_{I,m}q(t)\sin(2\pi f_c t) = Re\{d_m q(t) e^{j2\pi f_c t}\},$$

where $d_{R,m}$ and $d_{I,m}$ are determined by two independent message streams and represent the real and imaginary parts respectively of a complex QAM symbol, with m=1 ... M indexing a 2-dimensional QAM constellation of cardinality where M is the modulating carrier frequency, and q(t) is a root raised cosine pulse function.

A continuous series of transmitted QAM pulses s(t), at a rate of $F_s = 1/T_s$, passes through a noisy multipath channel. Thus, the received signal at the input to the QAM receiver is given by r(t)=s(t)*c(t)+v(t), where * denotes convolution, c(t) is the channel impulse response, and v(t) is additive white Gaussian noise.

Thus, $$r(t) = Re\left\{ e^{j2\pi(f_{LO}+f_o)t+\theta_o} \sum_{n=-\infty}^{+\infty} [d[n] * q(t)]c(t - nT_s) \right\} + v(t),$$

where d[n] is the complex transmitted symbol, $f_o$ and $\theta_o$ are the frequency and phase offsets respectively of the receiver passband to baseband demodulator local oscillator with respect to the transmitter, such that $f_{LO} = f_c - f_o$.

Passband to Baseband Demodulator

Figure 8:
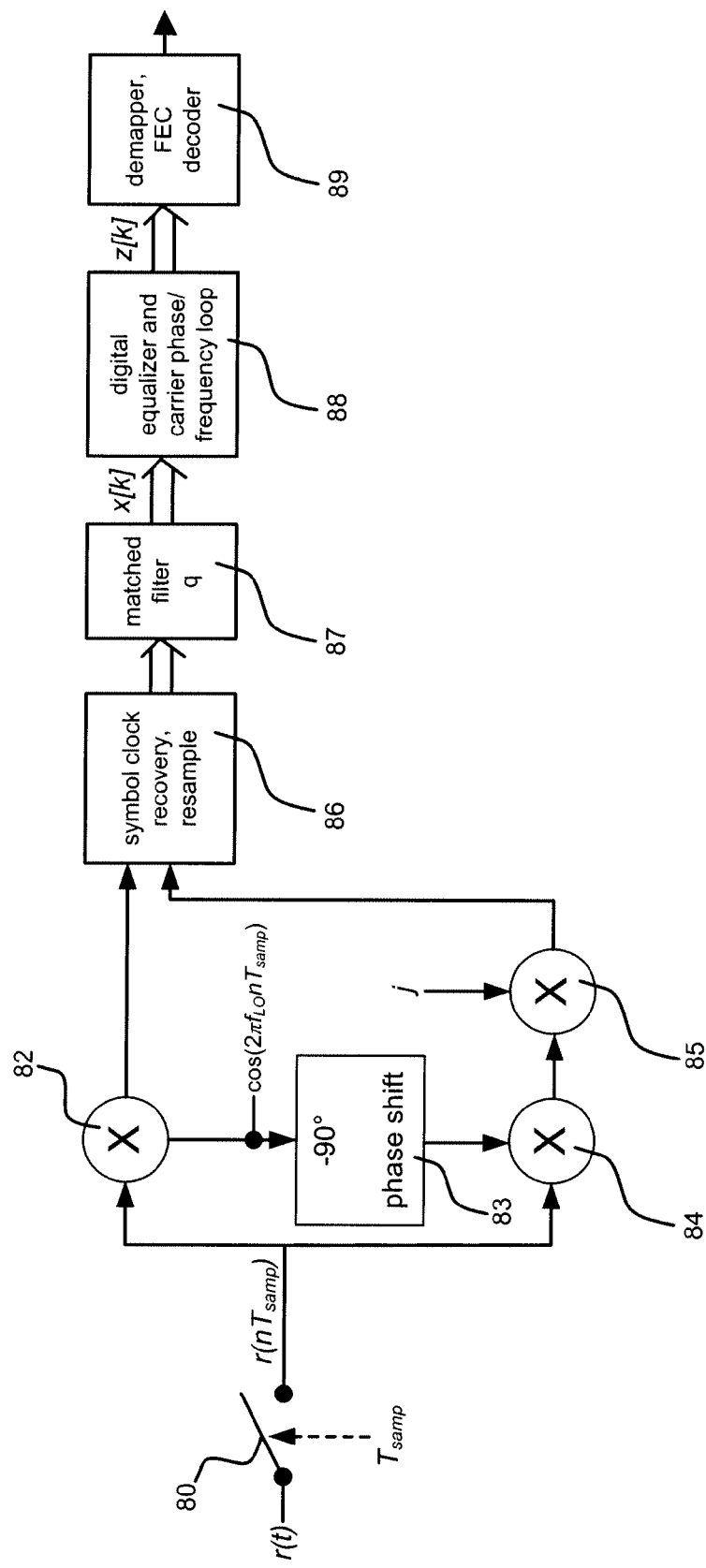
FIG. 8 illustrates a monitor side passband to baseband QAM demodulator according to certain aspects of the invention.

FIG. 8 shows monitor side passband to baseband QAM demodulator 62 (FIG. 6) in more detail. A signal r(t) may be received from a coax cable, for example, is sampled (see 80) at a rate higher than the symbol rate, resulting in the sampled signal $r(nT_{samp})$. After sampling:

$$r(nT_{samp}) = Re\left\{ e^{j2\pi(f_{LO}+f_o)nT_{samp}+\theta_o} \sum_{m=-\infty}^{+\infty} [d[m] * q(nT_{samp})]c(nT_{samp} - mT_s) \right\} + v(nT_{samp}).$$

Then, after downconversion, resampling at the symbol rate $1/T_s$ and matched filtering obtains:

$$x(kT_s) = x[k] = e^{j2\pi f_o kT_s + \theta_o} \sum_{m=-\infty}^{+\infty} d[m]c[k - m] + v'[k],$$

where v'[k] is sampled complex filtered noise, assuming that any ISI is due only to the channel impulse response c because of the pulse shaping and matched filtering q, combined with perfect symbol rate sample timing.

Equalizer and Carrier Phase/Frequency Loop

Figure 9:
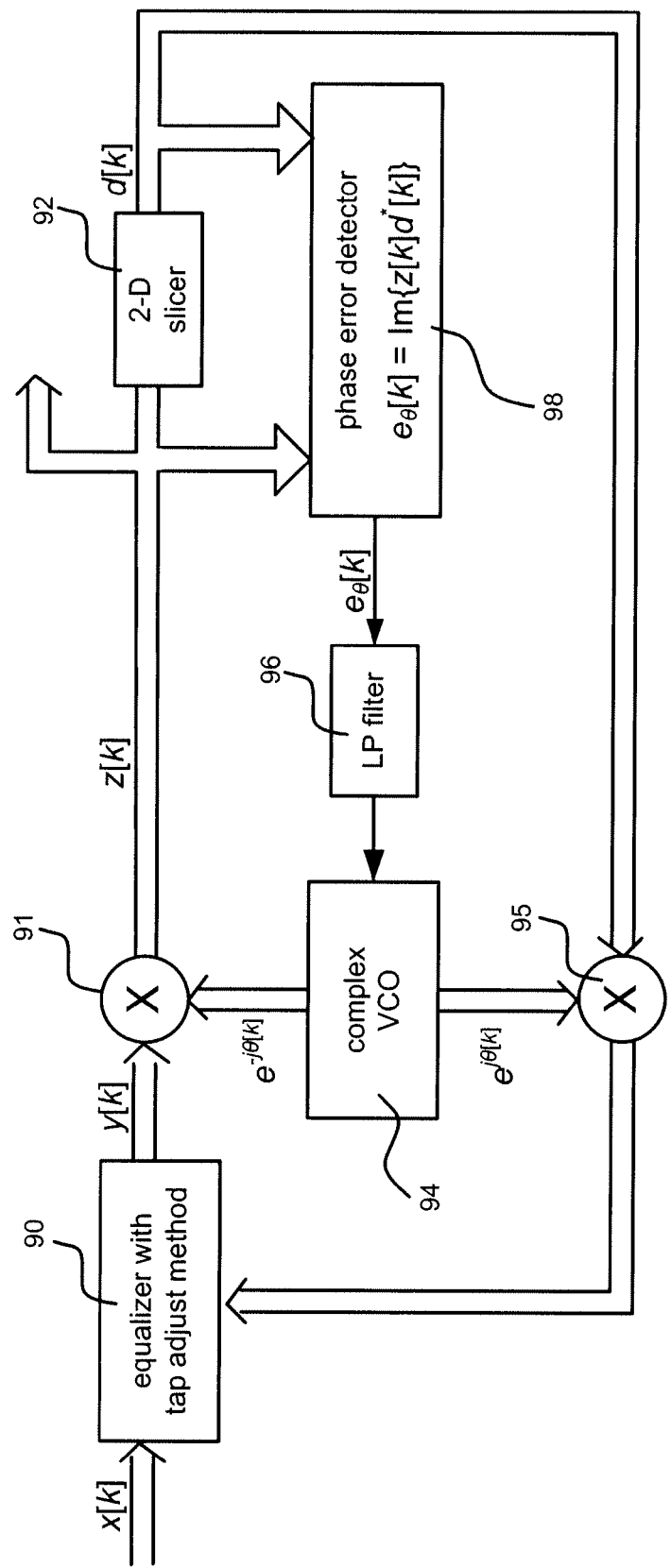
FIG. 9 illustrates a monitor side digital equalizer and carrier phase/frequency loop according to certain aspects of the invention.

The digital equalizer and carrier phase/frequency loop of FIG. 8 is discussed in more detail with reference to FIG. 9. A signal x[k] enters an adaptive digital equalizer 90, which can include a linear digital filter used to compensate for the tilt caused by the channel impulse response C. Tap weight adjustment can be achieved using one or more known methods, including the LMS algorithm. The equalizer compares its output y[k] with a phase rotated version of 2-dimensional ("2-D") slicer decision $\hat{d}[k]$ to create an error signal which is used to calculate an updated set of filter tap weights. The LMS algorithm may operate as follows:

let:
x[k] represent an N long equalizer input vector,
y[k] represents the equalizer output vector $g^H[k]x[k]$, where
$g^H[k]$ is the N long equalizer tap weight vector and the H superscript indicates conjugate transposition (Hermitian).

$$e[k] = \hat{d}[k] - y[k]$$

$$g[k+1] = g[k] - 2\mu x[k] e^*[k],$$

where μ is a small step size parameter and the * superscript indicates complex conjugation. In order to remove the effect of the passband cable tilt, after convergence the LMS equalizer taps may approximate the inverse of the channel impulse response c.

A 2-D slicer 92 independently slices the real and imaginary parts of z[k] and outputs $\hat{d}[k]$, which is an estimate of the originally transmitted d[k]. Both z[k] and $\hat{d}[k]$ enter phase error detector module 98 and form a phase error signal given by $e_\theta[k] = \text{Im}\{z[k]\hat{d}^*[k]\}$. Low pass ("LP") filter 96 can be an integral-proportional filter that allows the loop to correct both phase and frequency offsets. The output of low pass filter 96 feeds a complex discrete voltage controlled oscillator ("VCO") 94 that outputs a complex phase/frequency correction factor $e^{-j\theta[k]}$ which corrects for both $\theta_o$ and $f_o$. VCO 94 also provides an output ($e^{+j\theta[k]}$) that "un-corrects" the slice output $\bar{d}[k]$ so that it can be used to derive an error signal for the equalizer tap update. This is typically required because the equalizer operates on x[k]. Referring also to FIG. 8, the equalizer output z[k] is fed to a symbol demapper which converts the detected real and imaginary levels into groups of bits. The FEC decoder then executes Viterbi decoding, byte deinterleaving, and Reed-Solomon decoding to correct received bit errors and passes the resultant data to the MII interface.

Effect of Cable Length

Figure 11:
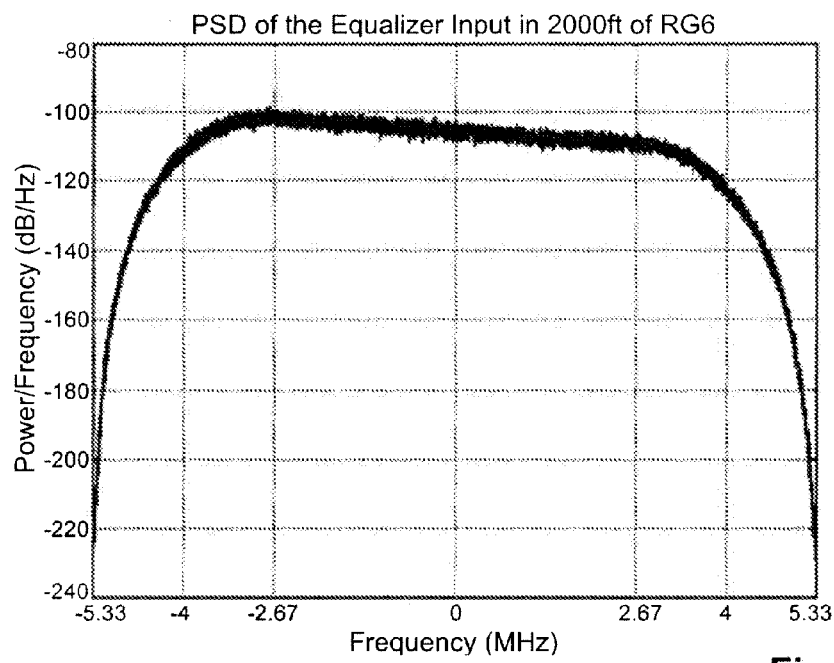
FIG. 11A depicts power spectral density (PSD) of equalizer input.
FIG. 11B depicts magnitude response of converged equalizer taps.
Figure 11B:
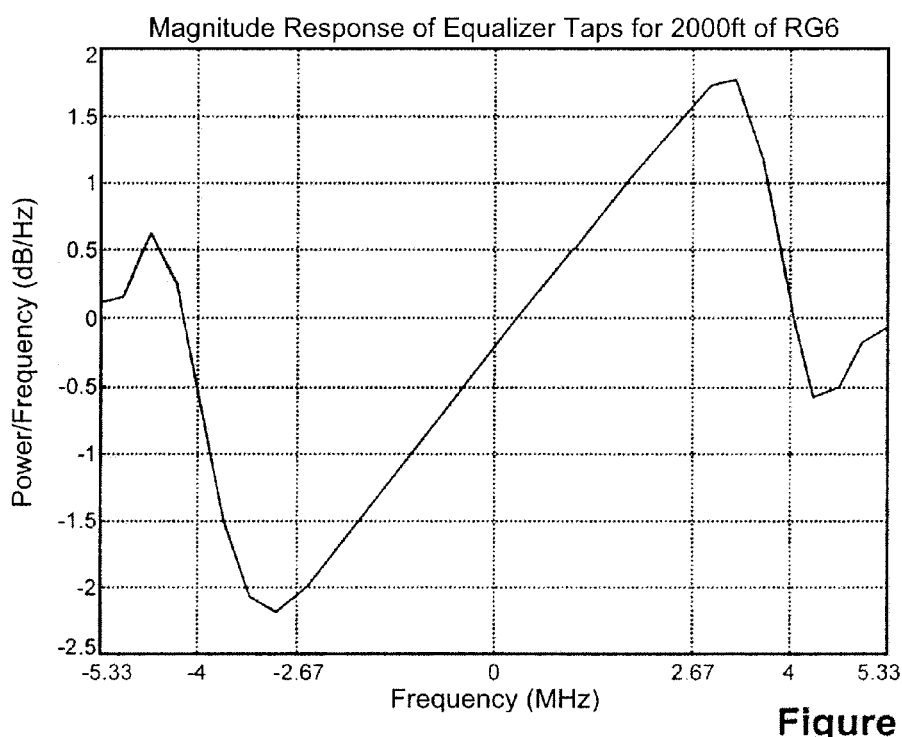

The received video signals can experience attenuation as a function of frequency attributable to certain characteristics of the cable. For the purposes of this discussion, the particular case of a coax cable is described. The severity of the attenuation, which is often referred to as tilt, typically depends on the cable type and length. FIGS. 10A and 10B, attenuation is depicted as a function of frequency for various lengths of cable types RG6 and RG59. It can be shown that the tilt is equivalent to multipath distortion, where the additional paths and main path have an extremely small delay spread. As the tilt increases, the number of non-trivial multipath components, and their respective gains, also increases. Multipath distortion causes ISI in the received signal and thus can severely degrade transmission reliability. In a digital signal, an equalizer can be used in the receiver to remove such impairment. FIGS. 11A and 11B show power spectral density (PSD) of the equalizer input and magnitude response of the converged equalizer taps, respectively. Specifically, FIG. 11A shows PSD of equalizer input after transmission through 2000 ft of RG-6 cable, with a carrier frequency of 15.98 MHz (both passband and relative baseband frequencies shown) and FIG. 11B shows the magnitude response of the converged digital equalizer taps.

Certain embodiments of the invention comprise a digital equalizer that can undo the tilt introduced by the cable, removing the ISI in the passband signal and enable reliable decoding of the transmitted data. As cable length increases, the digital passband signal at the monitor side can be reliably received using the digital equalizer and well-known forward error protection methods for digital data, such as concatenated Reed-Solomon coding and trellis coding. However, cable tilt also adversely affects the high frequencies of the baseband analog CVBS signal reducing the sharpness of the picture and the intensity of the colors as viewed on the monitor side. Therefore, certain embodiments provide an adaptable filter, such as an analog equalizer, that can be applied to the CVBS signal at the monitor side to compensate for cable tilt at baseband. Certain embodiments take advantage of the passband digital equalizer to estimate the amount of tilt at baseband and then select the appropriate one of a set of baseband analog filters to be applied to the received CVBS signal.

Efficient Estimation of Passband Tilt

In estimating the tilt in the signal band, a frequency band can be selected where the tilt in the PSD of the input signal will be approximately linear when quantified in dB. Therefore, the frequencies of −2.67 MHz to 2.67 MHz in the baseband digital equalizer input, which would thus correspond to 13.31 MHz and 18.65 MHz in the passband input signal, provide a suitable range. As shown in FIG. 10(a), the tilt from 13.31 MHz to 18.65 MHz is approximately 3.7 dB for 2000 feet of RG-6. To estimate the tilt in dB from the converged digital equalizer filter taps, the following computation can be performed:

$$\hat{\Delta}_{dB} = G_{dB}[k_1] - G_{dB}[k_2] = 10\log_{10}\left(\frac{|G[k_1]|^2}{|G[k_2]|^2}\right), \qquad (1)$$

where G[k] is the DFT of the time-domain converged equalizer filter taps and $k_1$ and $k_2$ correspond to specific frequency bins of the DFT. Since the digital equalization of FIG. 9 may be performed with a time-domain convolution, an FFT (or possibly N complex multiplies and additions for both points) is required for the purpose of estimating the tilt for a given $k_1$ and $k_2$. That is, $$G[k_1] = G_R[k_1] + iG_I[k_1] = \sum_{n=0}^{N-1} g[n]e^{-i2\pi n k_1/N}, \qquad (2)$$

where $g(n) = g_R(n) + ig_I(n)$, $n = 0, 1 \ldots N-1$ are the N time-domain equalizer taps (the dependency on the time index is omitted). Note that the 1/N scalar is unnecessary in this computation. A similar computation would be performed for $G(k_2)$. However, the computation can be significantly reduced by selecting the frequency bins carefully. By letting $k_1 = N/4$, corresponding to a frequency of 2.67 MHz, the complex exponential in equation (2) simplifies dramatically:

$$e^{-i2\pi n(N/4)/N} = \begin{cases} 1 & \text{for } n = 0, 4, \ldots N-4. \\ -i & \text{for } n = 1, 5, \ldots N-3. \\ -1 & \text{for } n = 2, 6, \ldots N-2. \\ i & \text{for } n = 3, 7, \ldots N-1. \end{cases} \qquad (3)$$

The real and imaginary parts of the filter frequency response can be computed using summations:

$$G_R[k_1] = \sum_{n=0}^{N/4-1} g_R[4n] + \sum_{n=0}^{N/4-1} g_I[4n+1] - \sum_{n=0}^{N/4-1} g_R[4n+2] - \sum_{n=0}^{N/4-1} g_I[4n+3]. \qquad (4)$$

$$G_I[k_1] = \sum_{n=0}^{N/4-1} g_I[4n] - \sum_{n=0}^{N/4-1} g_R[4n+1] - \sum_{n=0}^{N/4-1} g_I[4n+2] + \sum_{n=0}^{N/4-1} g_R[4n+3]. \qquad (5)$$

Finally, the power at this frequency bin is:

$$|G[k_1]|^2 = G_R^2[k_1] + G_I^2[k_1] \qquad (6)$$

By allowing $k_1=N/4$, the power computation is significantly simplified. Similarly, if $k_1=3N/4$, corresponding to a frequency of −2.67 MHz, the complex exponential will again be significantly simplified.

$$e^{-i2\pi n(3N/4)/N} = \begin{cases} 1 & \text{for } n = 0, 4, \ldots N-4. \\ i & \text{for } n = 1, 5, \ldots N-3. \\ -1 & \text{for } n = 2, 6, \ldots N-2. \\ -i & \text{for } n = 3, 7, \ldots N-1. \end{cases} \quad (7)$$

Figure 2:
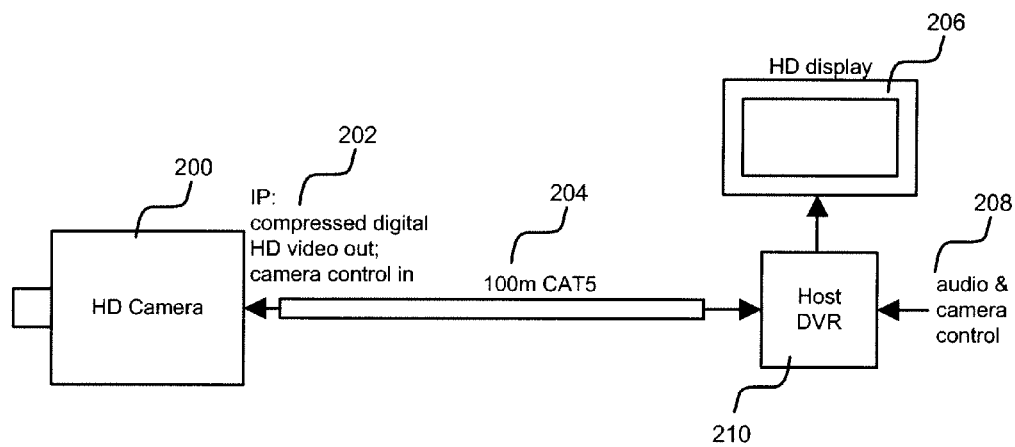
FIG. 2 shows a prior art coax transmission system for high definition video.

The real and imaginary parts are computed as:

$$G_R[k_2] = \sum_{n=0}^{N/4-1} g_R[4n] - \sum_{n=0}^{N/4-1} g_I[4n+1] - \sum_{n=0}^{N/4-1} g_R[4n+2] + \sum_{n=0}^{N/4-1} g_I[4n+3], \quad (8)$$

$$G_I[k_2] = \sum_{n=0}^{N/4-1} g_I[4n] + \sum_{n=0}^{N/4-1} g_R[4n+1] - \sum_{n=0}^{N/4-1} g_I[4n+2] - \sum_{n=0}^{N/4-1} g_R[4n+3], \quad (9)$$

and the power $|G[k_1]|^2$ is computed as above. In FIG. 2b, the upward tilt in the magnitude response (in dB) of the converged filter taps is approximately linear even with the modest SNR for a 64-QAM signal and the tap noise. Furthermore, when computed in this manner, $\hat{\Delta}_{dB} \approx 4.0$ dB, which is very close to the actual tilt over this band of 3.7 dB.

Using Passband Tilt Estimates for Baseband CVBS Tilt Correction

Figure 12A:
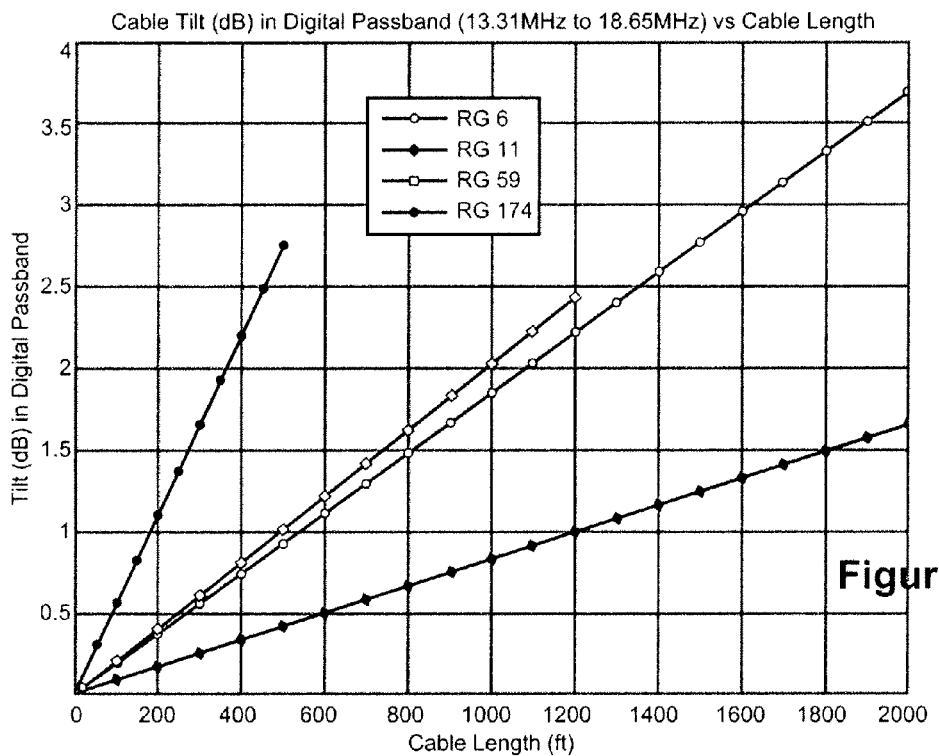
FIGS. 12A, 12B, 13A and 13B show loss versus tilt in a passband digital video signal at different frequencies.
Figure 12B:
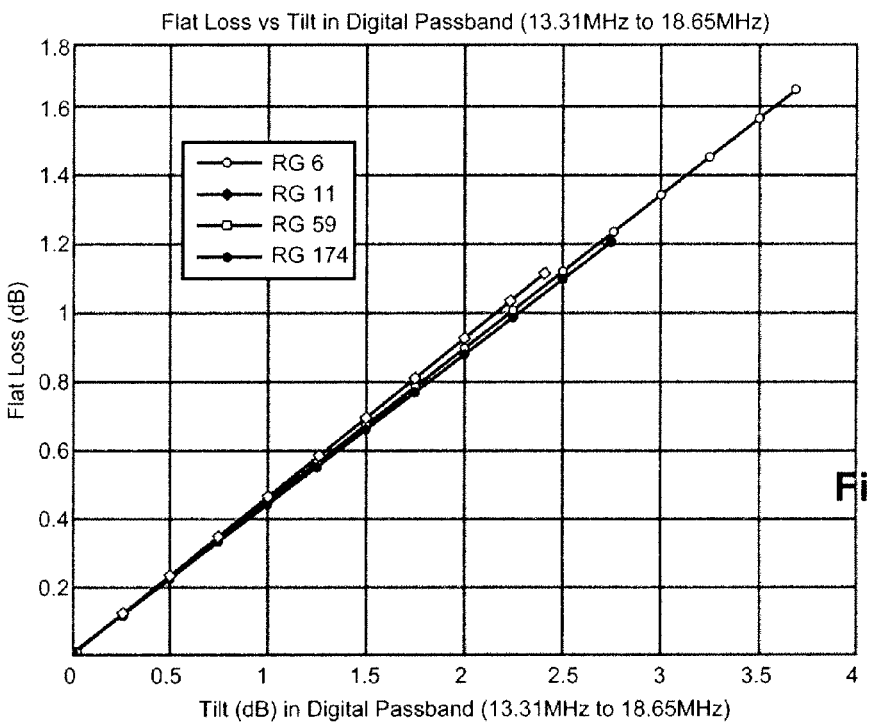
Figure 13A:
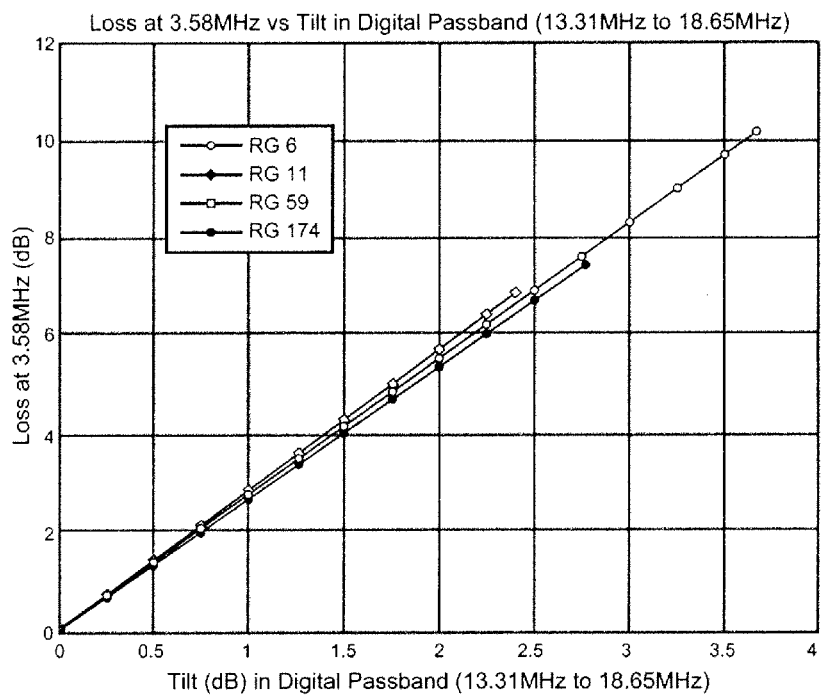
Figure 13B:
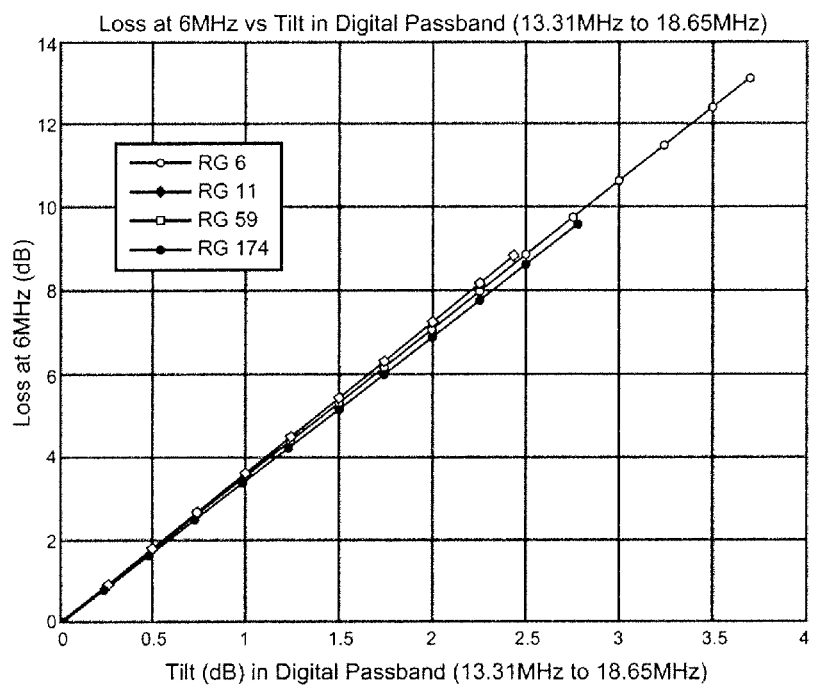

After estimating the passband tilt for the digital video signal, an appropriate baseband analog filter may be selected from one of M different filters. It can be shown that the estimated passband tilt of the digital video signal band will indicate the severity of the tilt in the baseband CVBS signal, which can then be roughly corrected with an analog filter. In FIG. 12A, the tilt in the digital video signal band from 13.31 MHz to 18.65 MHz is shown for RG-6, RG-11, RG-59, and RG-174 and likely lengths for those cables. FIG. 12A shows the loss at 3.58 MHz versus the tilt in the passband digital video signal for RG-6, RG-11, RG-59, and RG-174 cable types. FIG. 12B shows the loss at 6 MHz. It can be observed that the loss at 3.58 MHz and 6 MHz is roughly the same for all four cable types for a given tilt. FIG. 13A shows the loss at 3.58 MHz is shown versus the tilt in the passband digital video signal for RG-6, RG-11, RG-59, and RG-174 cable types. FIG. 13B shows the loss at 6 MHz. It will be observed that the loss at 3.58 MHz and 6 MHz is roughly the same for all four cable types for a given tilt.

Since the estimated passband tilt is the only available information concerning the frequency response of the cable, the ideal scenario is one where the frequency response of the cable at baseband (CVBS signal band) is related to the tilt of the passband digital signal in a known manner, regardless of cable type or length. FIGS. 12B, 13A and 13B confirm this situation in the frequency response at DC, 3.58 MHz, and 6 MHz. For example, at a tilt of 1.5 dB in the passband digital video signal, the loss at DC, loss at the color carrier (3.58 MHz), and the loss at 6 MHz is approximately 0.68 dB, 4.1 dB, and 5.3 dB, respectively for all four cables. Thus, regardless of whether the 1.5 dB of passband tilt was caused from 275 ft. of RG-174, 750 ft. of RG-59, 825 ft. of RG-6, or 1825 ft. of RG-11, the same analog filter would undo the baseband tilt of the CVBS signal.

One example of an algorithm used for selecting an appropriate analog filter from a set of M filters is shown below:

```
Inputs: |G[k₁]|², |G[k₂]|²
R_n = α_n|G[k₁]|², for n = 0,1,...,M.
ℛ_m = [R_m, R_{m+1}), for m = 0,1,...,M − 1.
If |G[k₂]|² ∈ ℛ_L then
    Select analog filter L.
end if
```

Figure 14:
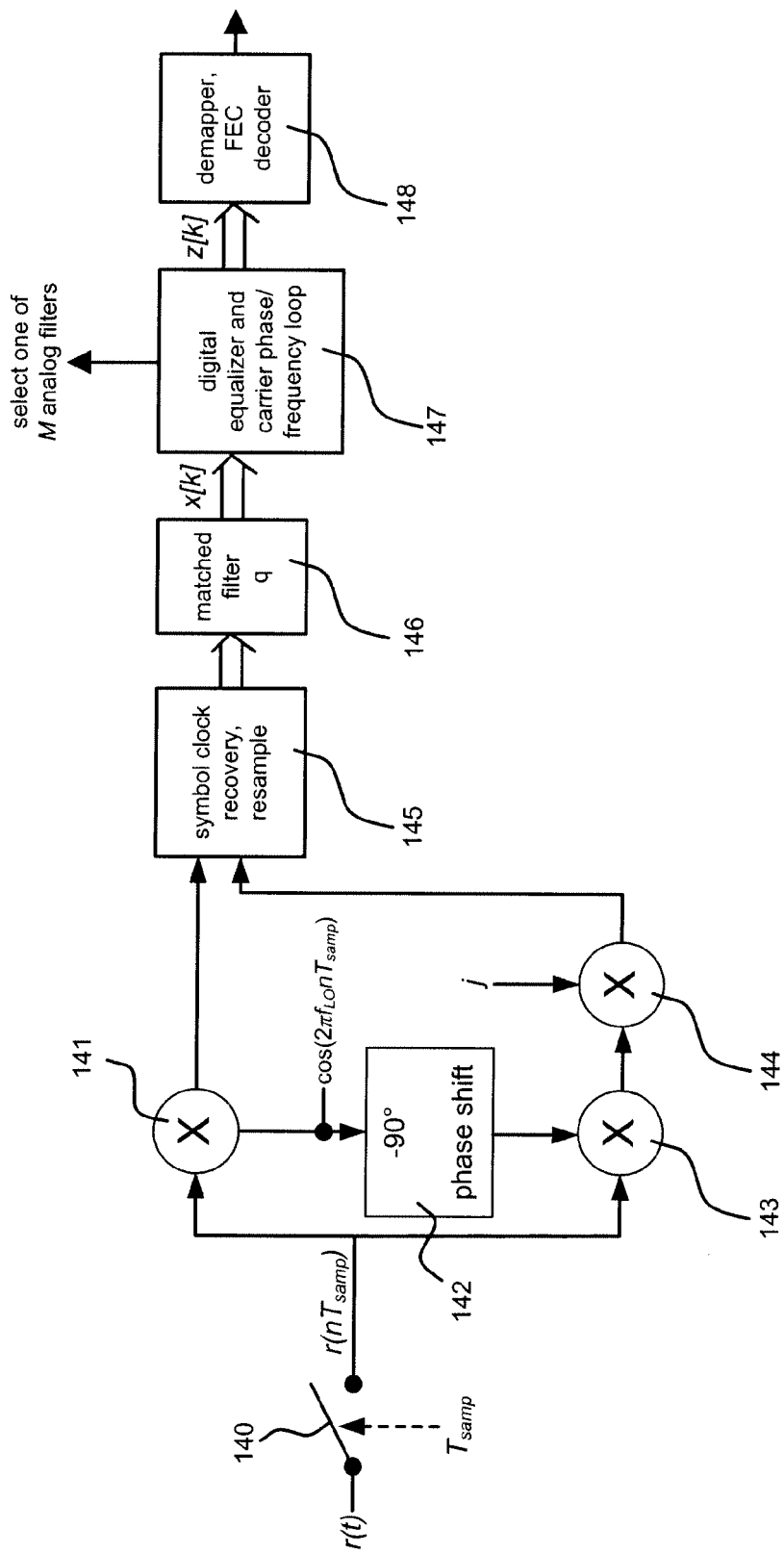
FIG. 14 shows a modified monitor side QAM demodulator with analog filter select output from a digital equalizer operating according to certain aspects of the invention.
Figure 15:
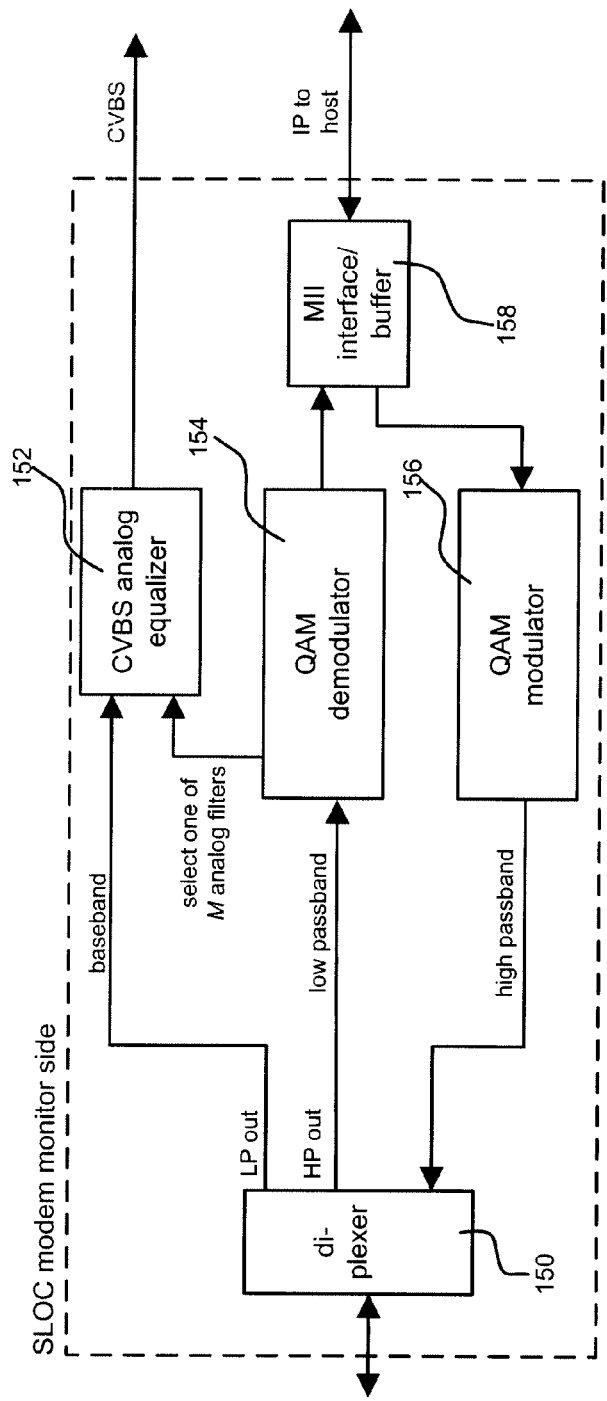
FIG. 15 shows a monitor side modem having a digital equalizer within the QAM demodulator according to certain aspects of the invention.

Note that $\alpha_0=1$; other values of $\alpha_n$ are <1 and are chosen so that bit-shifted additions are sufficient to compute $R_n$. Therefore, the monitor side QAM demodulator of FIG. 8 is typically modified such that the digital equalizer of the passband QAM demodulator provides a signal that selects one of M analog CVBS filter responses. FIG. 14 shows a modified monitor side QAM demodulator with analog filter select output from digital equalizer operating according to above described algorithm. FIG. 15 shows the entire monitor side modem with a digital equalizer within the QAM demodulator providing a filter select signal to CVBS analog equalizer.

Figure 16:
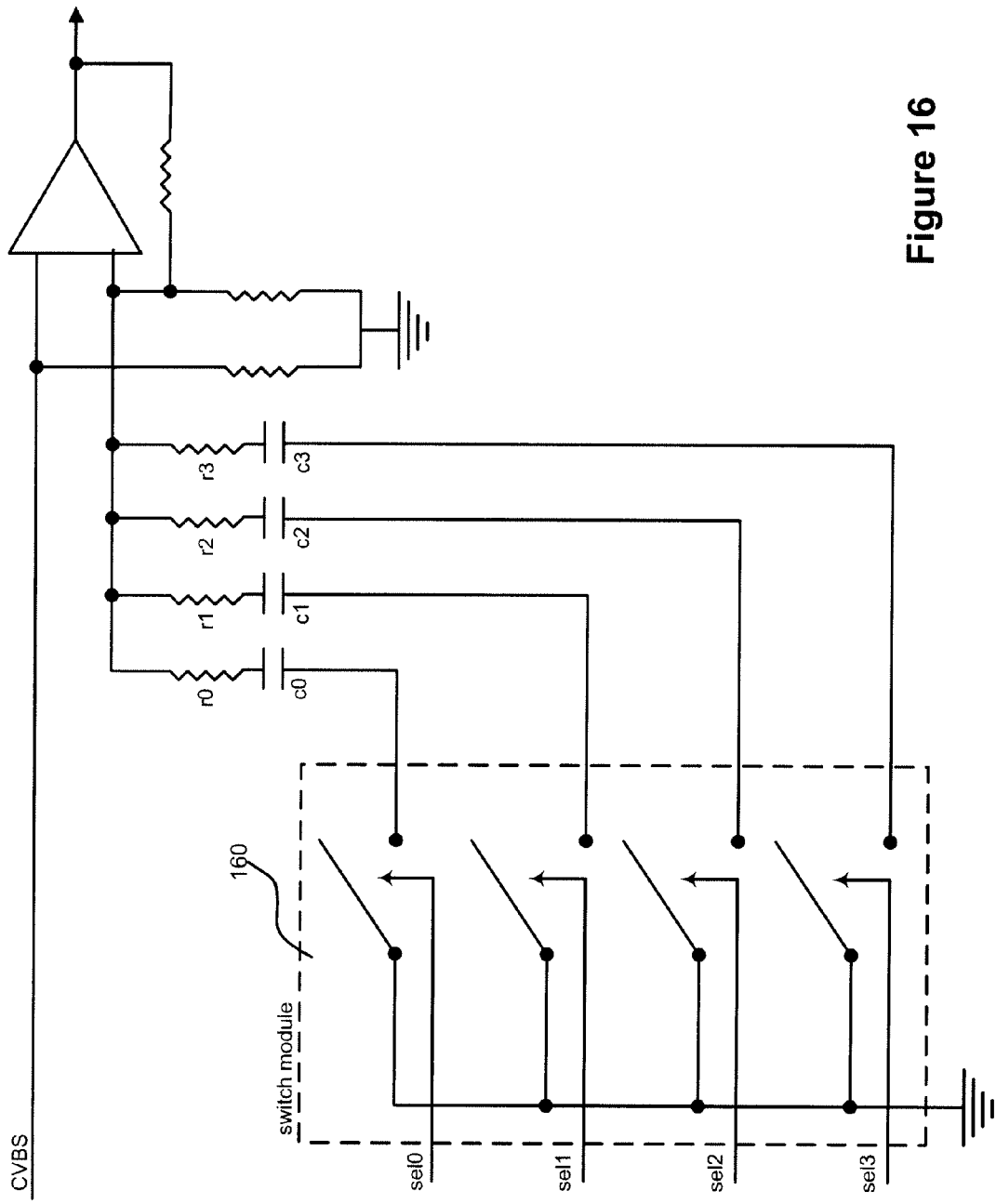
FIG. 16 depicts an analog active filter suitable for equalizing baseband CVBS according to certain aspects of the invention.
Figure 17:
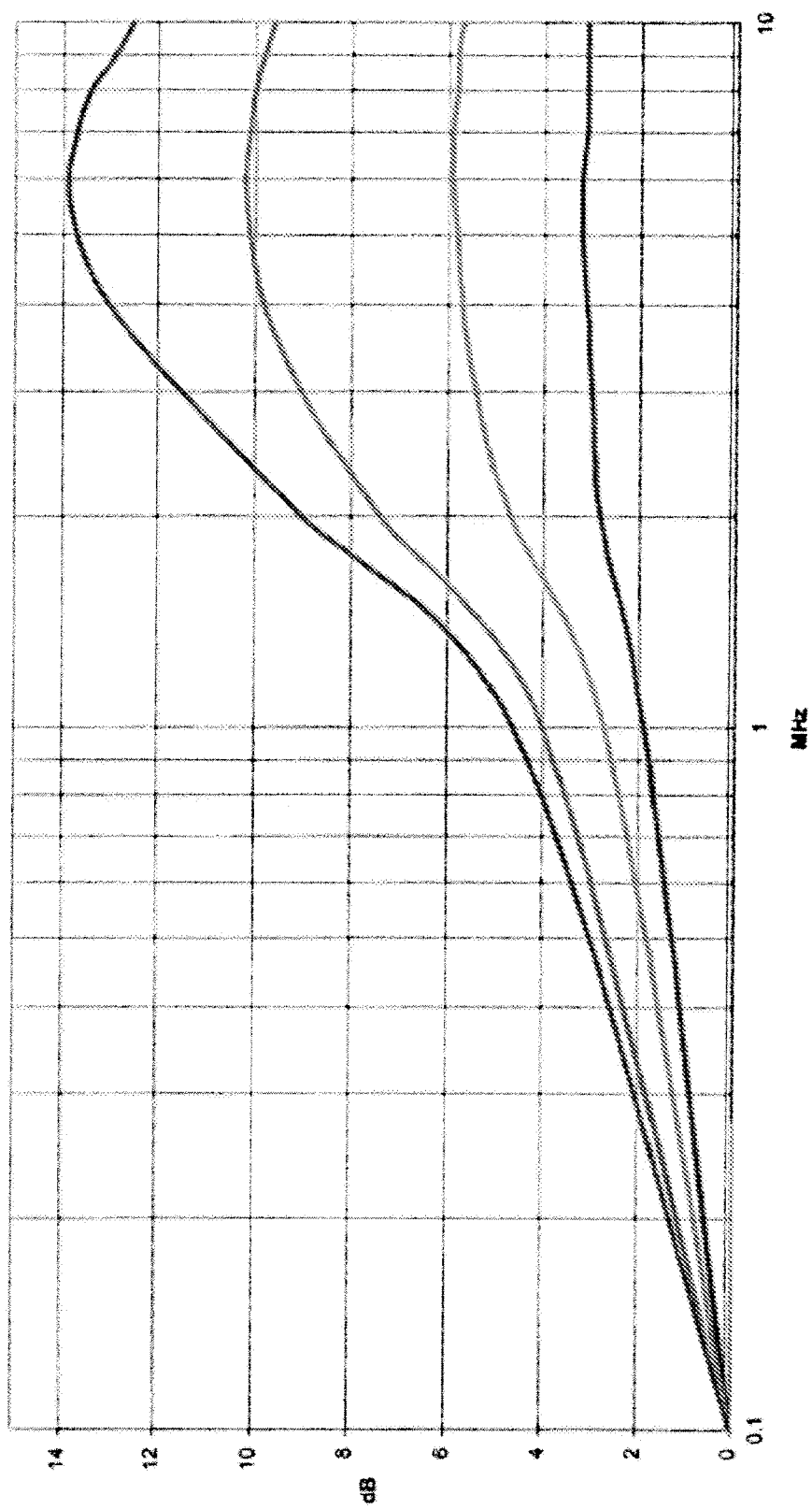
FIG. 17 shows examples of filter responses in certain embodiments of the invention.

An example of an analog active filter suitable for equalizing the baseband CVBS signal is shown in FIG. 16. In this example, M=3, so that there are 4 possible filtering selections. The desired filter response is selected by closing one of M+1 switches in switch module 160 which in turn grounds the respective RC pair connected to it. Possible filter responses are shown in FIG. 17.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. It will be further appreciated that the invention described here can be applied to digital communications systems employing other passband modulation and forward error correction methods. Those skilled in the art will also recognize that more than two points in the FFT of passband digital equalizer tap weight vector g[n] may be used to select an analog filter for the CVBS signal.

Those skilled in the art will also recognize that the invention could be practiced with other types of digital equalizer designs for the passband signal, including frequency domain equalizers, where the values of $G_1[k]$ and $G_2[k]$ will have already been calculated as part of the equalization process. Also, well known equalizer tap weight calculation methods other than LMS may be employed, such as RLS. Those skilled in the art will further recognize that the CVBS analog filter with selectable responses may take a form other than the one shown here.

Also, the equalizer for the CVBS signal may take the form of a digital filter, in which case the CVBS is sampled and digitized prior to equalization. In this case the tap weights of the digital filter are selected from a pre-determined set of M tap weight vectors according to the same algorithm that was described to select one of M analog filter responses.

Certain additional aspects and features of the invention are further set forth below, and can be obtained using the functionalities and components described in more detail above, as will be appreciated by those skilled in the art after being taught by the present disclosure.

Certain embodiments of the invention provide equalizers for use with a plurality of signals that are separated by frequency and carried by a cable between a transmitter and a receiver. Some of these embodiments comprise a digital equalizer that removes distortions from a digital signal received at the receiver. In some of these embodiments, wherein the digital equalizer calculates differences in attenuation of the digital signal at a plurality of different frequencies of the digital signal. Some of these embodiments comprise an analog equalizer that compensates for attenuations of the analog signal caused by the cable. In some of these embodiments, the analog equalizer uses the calculated differences in attenuation of the digital signal to select one or more baseband analog filters to compensate for the attenuations.

Certain embodiments of the invention provide an equalizer for use in a cable that carries a digital signal and a baseband analog signal separated by frequency between a transmitter and a receiver. Some of these embodiments comprise a digital equalizer that removes distortions from the digital signal received at the receiver. Some of these embodiments comprise an analog equalizer that compensates for attenuations of the analog signal caused by the cable. In some of these embodiments, the analog equalizer applies one of a set of baseband analog filters to compensate for the attenuations. In some of these embodiments, the applied baseband analog filter is selected based on an estimate calculated by the digital equalizer of difference in attenuation at different frequencies. In some of these embodiments, the transmitter is embodied in a camera and the receiver provides an equalized signal representative of the analog signal to a monitor. In some of these embodiments, the cable comprises a coax cable. In some of these embodiments, the distortions increase with the length of the cable.

In some of these embodiments, the distortions include multipath distortions. In some of these embodiments, the estimate of attenuation (tilt) is calculated from a frequency band having a power spectral density in which tilt is approximately linear. In some of these embodiments, the tilt is calculated using a fast Fourier transform for a plurality of filter taps. In some of these embodiments, frequency bins within the frequency band are selected to permit calculation of the frequency response of a filter of the digital equalizer. In some of these embodiments, the discrete Fourier transform of time-domain converged equalizer filter taps and corresponds to a specific frequency bin of the DFT. In some of these embodiments, the digital signal comprises a high-definition representation of video images captured by a camera, and wherein the analog signal comprises a standard-definition representation of the video images.

Certain embodiments of the invention provide methods for equalizing an analog signal in a cable that also carries a digital signal separated from the analog signal by frequency, the method being performed by a modem that receives the analog and digital signals and outputs a baseband video signal. Some of these embodiments comprise calculating tilt in the digital signal, wherein the tilt characterizes attenuation as a function of frequency attributable to the cable. Some of these embodiments comprise equalizing the digital signal based on the calculated tilt. Some of these embodiments comprise configuring an analog equalizer by using the calculated tilt to select one of a set of baseband analog filters. Some of these embodiments comprise equalizing the analog signal using the selected baseband analog filter. In some of these embodiments, the analog signal comprises a baseband video signal and the digital signal comprises a high definition version of the baseband video signal. In some of these embodiments, the cable comprises a coax cable and wherein the tilt varies with length of the cable. In some of these embodiments, the tilt derives from multi-path distortions. In some of these embodiments, calculating tilt includes estimating attenuations within a frequency band having a power spectral density in which tilt is approximately linear. In some of these embodiments, estimating attenuation includes using a fast Fourier transform for a plurality of filter taps. In some of these embodiments, estimating attenuation includes selecting frequency bins within the frequency band, wherein the selected frequency bins optimize the efficiency of the step of calculating the tilt.

Certain embodiments of the invention provide a method for equalizing an analog signal in a cable that also carries a digital signal separated from the analog signal by frequency. In some of these embodiments, the method is performed by a modem that comprises one or more processors configured to execute one or more program instructions. Some of these embodiments comprise executing, on the one or more processors, one or more program instructions that cause the modem to calculate tilt in the digital signal, wherein the tilt characterizes attenuation attributable to the cable as a function of frequency. Some of these embodiments comprise executing, on the one or more processors, one or more program instructions that cause the modem to equalize the digital signal based on the calculated tilt. Some of these embodiments comprise executing, on the one or more processors, one or more program instructions that cause the modem to configure an analog equalizer by using the calculated tilt to select one of a set of baseband analog filters. Some of these embodiments comprise executing, on the one or more processors, one or more program instructions that cause the modem to equalize the analog signal using the selected baseband analog filter. Some of these embodiments comprise executing, on the one or more processors, one or more program instructions that cause the modem to output the equalized analog signal.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system for use in a receiver that receives a plurality of signals separated by frequency and carried by a cable, wherein the system comprises:
   a digital equalizer that removes distortions from a digital signal which has been separated from an analog signal in the plurality of signals received at the receiver and that calculates differences in attenuation of the digital signal at a plurality of different frequencies of the digital signal; and
   an analog equalizer that compensates for attenuations of the analog signal caused by the cable, wherein the analog equalizer uses the calculated differences in attenuation of the digital signal to select one or more baseband analog filters to compensate for the attenuations in the analog signal after the analog signal has been separated from the digital signal.

2. The system of claim 1, wherein the analog signal and the digital signal are received from a transmitter embodied in a camera and wherein the receiver provides an equalized analog signal representative of the analog signal to a monitor.

3. The system of claim 2, wherein the cable comprises a coax cable.

4. The system of claim 3, wherein the distortions increase with the length of the cable.

5. The system of claim 1, wherein the distortions include multipath distortions.

6. The system of claim 1, further comprising a diplexer that separates the plurality of signals to provide the digital signal and the analog signal.

7. The system of claim 1, further comprising a diplexer that separates a baseband portion of the plurality of signals from a passband portion of the plurality of signals, wherein the baseband portion comprises the analog signal and the passband portion comprises the digital signal.

8. A system for use in a receiver that receives a plurality of signals separated by frequency and carried by a cable, wherein the system comprises:
    a digital equalizer that removes distortions from a digital signal received at the receiver and that calculates differences in attenuation of the digital signal at a plurality of different frequencies of the digital signal; and
    an analog equalizer that compensates for attenuations of an analog signal caused by the cable, wherein the analog equalizer uses the calculated differences in attenuation of the digital signal to select one or more baseband analog filters to compensate for the attenuations,
    wherein the distortions include multipath distortions, and
    wherein the calculated differences in attenuation includes an estimate of attenuation calculated from a frequency band having a power spectral density in which tilt is approximately linear.

9. The system of claim 8, wherein the tilt is calculated using a fast Fourier transform for a plurality of filter taps.

10. The system of claim 8, wherein frequency bins within the frequency band are selected to permit calculation of the frequency response of a filter of the digital equalizer using the summations:

$$G_R[k_1] = \sum_{n=0}^{N/4-1} g_R[4n] + \sum_{n=0}^{N/4-1} g_I[4n+1] - \sum_{n=0}^{N/4-1} g_R[4n+2] - \sum_{n=0}^{N/4-1} g_I[4n+3]$$

$$G_I[k_1] = \sum_{n=0}^{N/4-1} g_I[4n] - \sum_{n=0}^{N/4-1} g_R[4n+1] - \sum_{n=0}^{N/4-1} g_I[4n+2] + \sum_{n=0}^{N/4-1} g_R[4n+3],$$

wherein G[k] is the discrete Fourier transform (DFT) of time-domain converged equalizer filter taps and $k_1$ corresponds to a specific frequency bin of the DFT.

11. The system of claim 1, wherein the digital signal comprises a high-definition representation of video images captured by a camera, and wherein the analog signal comprises a standard-definition representation of the video images.

12. A method for equalizing an analog signal in a cable that also carries a digital signal separated from the analog signal by frequency, the method being performed by a modem that receives the analog and digital signals and outputs a baseband video signal comprising:
    separating the analog signal from the digital signal; and
    subsequent to the separating:
        calculating tilt in the digital signal, wherein the tilt characterizes attenuation attributable to the cable as a function of frequency;
        equalizing the digital signal based on the calculated tilt;
        configuring an analog equalizer by using the calculated tilt to select one of a set of baseband analog filters; and
        equalizing the analog signal using the selected baseband analog filter.

13. The method of claim 12, wherein the analog signal comprises a baseband video signal and the digital signal comprises a high definition version of the baseband video signal.

14. The method of claim 13, wherein the cable comprises a coax cable and wherein the tilt varies with length of the cable.

15. The method of claim 14, wherein the tilt derives from multi-path distortions.

16. A method for equalizing an analog signal in a cable that also carries a digital signal separated from the analog signal by frequency, the method being performed by a modem that receives the analog and digital signals and outputs a baseband video signal comprising:
    calculating tilt in the digital signal, wherein the tilt characterizes attenuation attributable to the cable as a function of frequency;
    equalizing the digital signal based on the calculated tilt;
    configuring an analog equalizer by using the calculated tilt to select one of a set of baseband analog filters; and
    equalizing the analog signal using the selected baseband analog filter,
    wherein calculating tilt includes estimating attenuations within a frequency band having a power spectral density in which tilt is approximately linear.

17. The method of claim 16, wherein estimating attenuation includes using a fast Fourier transform for a plurality of filter taps.

18. The method of claim 17, wherein estimating attenuation includes selecting frequency bins within the frequency band, wherein the selected frequency bins optimize the efficiency of the step of calculating the tilt.

19. A method for equalizing an analog signal in a cable that also carries a digital signal separated from the analog signal by frequency, the method being performed by a modem that comprises one or more processors configured to execute one or more program instructions, the method comprising:
    executing, on the one or more processors, one or more program instructions that cause the modem to calculate tilt in the digital signal, wherein the tilt characterizes attenuation attributable to the cable as a function of frequency;
    executing, on the one or more processors, one or more program instructions that cause the modem to equalize the digital signal based on the calculated tilt;
    executing, on the one or more processors, one or more program instructions that cause the modem to configure an analog equalizer by using the calculated tilt to select one of a set of baseband analog filters;
    executing, on the one or more processors, one or more program instructions that cause the modem to equalize the analog signal using the selected baseband analog filter after the analog signal has been separated from the digital signal; and
    executing, on the one or more processors, one or more program instructions that cause the modem to output the equalized analog signal.

* * * * *